US00RE39246E

(19) United States
(12) Reissued Patent
Putzig

(10) Patent Number: US RE39,246 E
(45) Date of Reissued Patent: Aug. 22, 2006

(54) ESTERIFICATION CATALYSTS AND PROCESSES THEREFOR AND THEREWITH

(75) Inventor: Donald Edward Putzig, Newark, DE (US)

(73) Assignee: E. I. du Pont de Nemours and Company, Wilmington, DE (US)

(21) Appl. No.: 10/188,199

(22) Filed: Jul. 2, 2002

Related U.S. Patent Documents

Reissue of:
(64) Patent No.: 6,166,170
Issued: Dec. 26, 2000
Appl. No.: 09/453,100
Filed: Dec. 2, 1999

(51) Int. Cl.
*C08G 63/78* (2006.01)
*B01J 31/00* (2006.01)

(52) U.S. Cl. ..... 528/279; 528/274; 528/286; 528/300; 528/302; 528/308; 528/308.6; 524/706; 524/713; 524/755; 524/765; 524/766; 524/767; 524/773; 524/783; 524/800; 502/102; 502/111; 502/114; 502/121; 502/123; 502/126

(58) Field of Classification Search ..... 528/274, 528/279, 286, 300, 302, 308, 308.6; 524/706, 524/713, 755, 765, 766, 767, 773, 783, 800; 502/103, 111, 114, 121, 123, 126
See application file for complete search history.

(56) References Cited

U.S. PATENT DOCUMENTS

| | | | | | |
|---|---|---|---|---|---|
| 3,056,818 | A | * | 10/1962 | Werber | 260/410.6 |
| 3,326,965 | A | * | 6/1967 | Scheitheis et al. | 260/475 |
| 3,338,935 | A | * | 8/1967 | Kerschner et al. | 260/429.5 |
| 3,441,540 | A | * | 4/1969 | Müller et al. | 260/75 |
| 4,010,145 | A | * | 3/1977 | Russin et al. | 260/75 R |
| 4,031,165 | A | * | 6/1977 | Saiki et al. | 260/860 |
| 4,277,415 | A | * | 7/1981 | Sugerman et al. | 260/429.9 |
| 4,361,694 | A | * | 11/1982 | Weinberg et al. | 528/279 |
| 4,424,140 | A | * | 1/1984 | Weinberg et al. | 502/155 |
| 4,452,969 | A | * | 6/1984 | McCready | 528/279 |
| 4,452,970 | A | * | 6/1984 | Brunelle | 528/279 |
| 4,482,700 | A | * | 11/1984 | Kuhnrich et al. | 528/279 |
| 4,512,928 | A | * | 4/1985 | Sugerman et al. | 260/410.9 R |
| 5,015,759 | A | * | 5/1991 | Lowe | 560/91 |
| 5,120,822 | A | * | 6/1992 | Hoeschele et al. | 528/272 |
| 5,453,479 | A | * | 9/1995 | Borman et al. | 528/279 |
| 5,519,108 | A | * | 5/1996 | Yuo et al. | 528/287 |
| 5,922,828 | A | * | 7/1999 | Schiraldi | 528/279 |
| 6,043,335 | A | * | 3/2000 | Banach et al. | 528/279 |
| 6,060,579 | A | * | 5/2000 | Ohme et al. | 528/279 |

FOREIGN PATENT DOCUMENTS

| | | | | |
|---|---|---|---|---|
| EP | 0 634435 | A1 | | 1/1995 |
| EP | 0 634 435 | A1 | * | 1/1995 |
| EP | 0 812 818 | A1 | * | 12/1997 |
| EP | 0 812818 | A1 | | 12/1997 |
| JP | 46-27552 | | * | 8/1971 |
| JP | 47-26437 | | * | 7/1972 |
| JP | 61-11248 | | * | 4/1986 |
| JP | 61-25738 | | * | 6/1986 |
| JP | 63-15937 | | * | 4/1988 |
| JP | 7-39481 | | * | 5/1995 |
| WO | WO 97/47675 | | * | 12/1997 |
| WO | WO 99/28033 | | * | 6/1999 |

* cited by examiner

*Primary Examiner*—Samuel A. Acquah

(57) ABSTRACT

A catalyst composition is disclosed. The composition comprises a titanium compound, a complexing agent, hypophosphorous acid or its metal salt, water and optionally a solvent. The complexing agent can be hydroxycarboxylic acid, alkanolamines, aminocarboxylic acids, or combinations of two or more thereof. The solvent can be water, ethanol, propanol, isopropanol, butanol, ethylene glycol, propylene glycol, isopropylene glycol, butylene glycol, 1-methyl propylene glycol, pentylene glycol, or combinations of two or more thereof. The titanium compound can be combined with a zirconium compound. Also disclosed is a process for using the composition for producing an ester or a polyester. The process comprises contacting a carbonyl compound, in the presence of the compositions, with an alcohol under a condition suitable for esterification, transesterification, polymerization, or combinations of two or more thereof.

80 Claims, No Drawings

ESTERIFICATION CATALYSTS AND PROCESSES THEREFOR AND THEREWITH

Matter enclosed in heavy brackets [ ] appears in the original patent but forms no part of this reissue specification; matter printed in italics indicates the additions made by reissue.

FIELD OF INVENTION

This invention relates to a catalyst composition comprising a hypophosphorous acid and to a process for using the composition in, for example, esterification, transesterification, or polymerization of a carbonyl compound.

BACKGROUND OF THE INVENTION

Polyesters such as, for example, polyethylene terephthalate, polytrimethylene terephthalate and polybutylene terephthalate, generally referred to as "polyalkylene terephthalates", are a class of important industrial polymers. They are widely used in thermoplastic fibers, films, and molding applications.

Polyalkylene terephthalates can be produced by transesterification of a dialkyl terephthalate ester with a glycol followed by polycondensation or by direct esterification of terephthalic acid with the selected glycol followed by polycondensation. A catalyst is used to catalyze the esterification, transesterification or polycondensation.

Antimony, in the form of a glycol solution of antimony oxide, frequently is used as catalyst in the transesterification or esterification process. However, antimony forms insoluble antimony complexes that plug fiber spinnerets and leads in fiber spinning to frequent shutdowns to wipe spinnerets clean of precipitated antimony compounds. The antimony-based catalysts are also coming under increased environmental pressure and regulatory control, especially in food contact applications.

Organic titanates, such as tetraisopropyl and tetra n-butyl titanates, are known to be effective polycondensation catalysts for producing polyalkylene terephthalates in general, and frequently are the catalyst of choice. However, these catalysts tend to hydrolyze on contact with water forming glycol-insoluble oligomeric species, which lose catalytic activity. These organic titanates also generate a significant amount of yellow discoloration when used as polyesterification catalysts. Additionally, many organic titanate catalysts are also substantially insoluble in a polymerization mixture thereby creating non-uniform distribution of catalyst in the mixture.

Water compatible titanates, such as titanium bis-ammonium lactate, bis-triethanolamine titanate or the titanium sodium citrate catalysts disclosed in EP 812818, when used as polyesterification catalysts, generate significant yellow discoloration in the resultant polymer. Similarly, WO 99/28033 discloses an organometallic compound for producing an ester. The organometallic compound comprises the reaction product of an orthoester of titanium, zirconium, or aluminum, an alcohol containing at least two hydroxyl groups, an organophosphorus compound, and a base. When used as polyesterification catalyst, however, it was found that the organometallic compound also generates undesirably significant yellow discoloration in the final product.

Therefore, there is an increasing need for the development of a new catalyst that is substantially soluble in a glycol, is efficient, produces a polymer with reduced color, exhibits good catalytic activity, does not result in plugging fiber spinnerets, and is environmentally friendly.

An advantage of the present invention catalyst composition is that the polymer produced using the invention catalyst has improved optical properties (e.g., less undesirable color) compared to polymer produced using an organic titanate catalyst alone. Another advantage of the present invention is that the invention catalyst is soluble in an alcohol used to produce a polyester, does not generate precipitates in the polyester that plug fiber spinnerets, and is environmentally friendly. Other advantages will become more apparent as the invention is more fully disclosed herein below.

SUMMARY OF THE INVENTION

According to a first embodiment of the present invention, a catalyst composition, which can be used as an esterification or transesterification catalyst, or as a polycondensation catalyst to produce polyalkylene terephthalates, is provided. The composition comprises titanium or a titanium compound, a complexing agent, *optionally a* hypophosphorous acid or a salt thereof and optionally a solvent. The complexing agent is selected from the group consisting of hydroxycarboxylic acids, alkanolamines, aminocarboxylic acids, and combinations thereof.

According to a second embodiment of the present invention, a process which can be used in, for example, the production of an ester or polyester is provided. The process comprises contacting, in the presence of a catalyst composition, a carbonyl compound with an alcohol. The catalyst composition can be the same as that disclosed above.

DETAILED DESCRIPTION OF THE INVENTION

The catalyst composition of this invention is substantially soluble in a solvent. The term "substantially" means more than trivial. It is preferred that the composition be completely soluble in the solvent. However, a substantial portion of the composition can also be suspended or dispersed in the solvent.

According to the first embodiment of the present invention, a catalyst composition is provided. The composition can comprise, consist essentially of, or consist of a titanium compound, a complexing agent, and hypophosphorous acid or a salt thereof. The composition can further comprise a solvent.

According to the invention, the preferred titanium compounds are organic titanium compounds. Titanium tetrahydrocarbyloxides, also referred to as tetraalkyl titanates herein, are presently most preferred organic titanium compounds because they are readily available and effective. Examples of suitable titanium tetrahydrocarbyloxide compounds include those expressed by the general formula $Ti(OR)_4$ where each R is individually selected from an alkyl, cycloalkyl, alkaryl, hydrocarbyl radical containing from 1 to about 30, preferably 2 to about 18, and most preferably 2 to 12 carbon atoms per radical and each R can be the same or different. Titanium tetrahydrocarbyloxides in which the hydrocarboxyl group contains from 2 to about 12 carbon atoms per radical which is a linear or branched alkyl radical are most preferred because they are relatively inexpensive, more readily available, and effective in forming the solution. Suitable titanium tetrahydrocarbyloxides include, but are not limited to, titanium tetraethoxide, titanium tetrapropoxide, titanium tetraisopropoxide, titanium tetra-n-butoxide, titanium tetrahexoxide, titanium tetra 2-ethylhexoxide, titanium tetraoctoxide, and combinations of two or more thereof.

The presence of a halide, or of other active substituent, in the R group generally is avoided since such substituents can interfere with catalytic reactions or form undesired by-products, which can contaminate the polymer when the titanium compound is used for producing a polymer. Presently it is also preferred that the each R group is identical to facilitate synthesis of the organic titanate. In some cases two or more R groups can be from a common compound chemically bonded together other than at the titanium atom (i.e., multidentate ligands such as triethanol amine, citric acid, or lactic acid).

According to the invention, the titanium tetrahydrocarbyloxide can also be combined with a zirconium compound to produce a mixture comprising a titanium tetrahydrocarbyloxide and a zirconium tetrahydrocarbyloxide. The presently preferred zirconium tetrahydrocarbyloxides include, but are not limited to, zirconium tetraethoxide, zirconium tetrapropoxide, zirconium tetraisopropoxide, zirconium tetra-n-butoxide, zirconium tetrahexoxide, zirconium tetra 2-ethylhexoxide, zirconium tetraoctoxide, and combinations of two or more thereof. The molar ratio of Ti/Zr can be in the range of from about 0.001:1 to about 10:1.

The titanium tetrahydrocarbyloxides suitable for use in the present invention can be produced by, for example, mixing titanium tetrachloride and an alcohol in the presence of a base, such as ammonia, to form the titanium tetracarbyloxide or tetraalkyl titanate. The alcohol can be ethanol, n-propanol, isopropanol, n-butanol, or isobutanol. Methanol generally is not employed because the resulting titanium tetramethoxide is insoluble in the reaction mixture thereby complicating its isolation. Titanium tetrahydrocarbyloxides thus produced can be recovered by first removing by-product ammonium chloride by any means known to one skilled in the art such as filtration followed by distilling the titanium tetrahydrocarbyloxides from the reaction mixture. This process can be carried out at a temperature in the range of from about 0 to about 1 50° C. Titanates having longer alkyl groups can also be produced by transesterification of those having R groups up to $C_4$ with alcohols having more than 4 carbon atoms per molecule.

Examples of commercially available organic titanium compounds include, but are not limited to, TYZOR® TPT and TYZOR® TBT (tetra isopropyl titanate and tetra n-butyl titanate, respectively) available from E. I. du Pont de Nemours and Company, Wilmington, Del., U.S.A.

The complexing agents suitable for use in the present invention are generally hydroxycarboxylic acids, alkanolamines, aminocarboxylic acids, or combinations of two or more thereof. It is presently preferred that the complexing agents be α-hydroxycarboxylic acids, alkanolamines, or α-aminocarboxylic acids in which the hydrocarbyl group or alkyl group has 1 to about 15, preferably 1 to *10* carbon atoms per group, and combinations of two or more thereof. Examples of suitable complexing agents include, but are not limited to, lactic acid, glycolic acid, citric acid, tartaric acid, malic acid, diethanolamine, triethanolamine, tetrahydroxyisopropylethylenediamine, glycine, bis-hydroxyethyl glycine, hydroxyethyl glycine, and combinations of two or more thereof.

According to the invention, the hypophosphorous acid is an inorganic acid having the formula of $H_2P(O)OM$ in which M is hydrogen, ammonium ion, a metal ion, or combinations of two or more thereof and the phosphorus atom is bonded to two hydrogen atom. The metal ion can be any metal ion. It is presently preferred that the metal ion be an alkali metal ion. The hypophosphorous acid or its metal salt is commercially available as an aqueous solution and it is typically used herein as an aqueous solution.

Any solvent that can substantially dissolve the catalyst composition disclosed above can be used in the present invention. The presently preferred solvent is water or an alcohol having the formula of $R^1(OH)_n$, an alkylene glycol of the formula $(HO)_nA(OH)_n$, a polyalkylene glycol or alkoxylated alcohol having the formula of $R^1O[CH_2CH(R^1)O]_nH$, or combinations of two or more thereof in which each $R^1$ can be the same or different and is a hydrocarbyl radical having 1 to about 10, preferably 1 to about 8, and most preferably 1 to 5 carbon atoms per radical. The presently preferred $R^1$ is an alkyl radical, either branched or straight chain. A is an alkylene radical having 2 to about 10, preferably 2 to about 7, and most preferably 2 to 4 carbon atoms per molecule. Each n can be the same or different and is independently a number in the range of from 1 about to about 10, preferably 1 to about 7, and most preferably 1 to 5. Examples of suitable solvents include, but are not limited to, ethanol, propanol, isopropanol, butanol, ethylene glycol, propylene glycol, isopropylene glycol, butylene glycol, 1-methyl propylene glycol, pentylene glycol, diethylene glycol, triethylene glycol, 2-ethyl hexanol, and combinations of two or more thereof. The presently preferred solvent is water, ethylene glycol, or combinations thereof. The presently most preferred solvent is water.

Alternatively, the solvent can be that which is formed on reaction of the tetraalkyltitanate with the complexing agent such as, for example, isopropyl alcohol from tetraisopropyltitanate or n-butyl alcohol from tetra n-butyltitanate.

According to the first embodiment of the present invention, the molar ratio of the complexing agent to titanium compound, can be any effective ratio that can substantially prevent the precipitation of the titanium compound in the presence of a solvent. Generally, the ratio can be in the range of from about 1:1 to about 10:1, preferably about 1:1 to about 7:1, and most preferably 1:1 to 4:1. The molar ratio of hypophosphorous acid or its salt to titanium compound (P:Ti) can be any ratio that, when the composition is used as catalyst to produce a polyester, can reduce the yellowness of the polyester. The preferred ratio can be in the range of from about 0.1:1 to about 10:1, preferably about 0.5:1 to about 7:1, and most preferably 1:1 to 4:1. A solvent can be present in the composition to produce s soluble or substantially soluble composition. Alternatively, the titanium compound can be present in the catalyst composition in the range of from about 0.01 to about 30, preferably about 0.1 to about 15, and most preferably 0.5 to 10 percent (%), based on total weight of the composition as 100%.

The catalyst composition can be produced by any means known to one skilled in the art.

The catalyst composition can also be produced, in addition to water, in a second solvent that is compatible with or does not interfere with an esterification or transesterification or polycondensation reaction. For example, if the catalyst composition is used as a polycondensation catalyst for producing polyethylene [terephtalate] *terephthalate*, the composition is preferably produced in ethylene glycol; if the catalyst composition is used for producing polybutylene [terephtalate] *terephthalate*, the composition is preferably produced in 1,4-butanediol; and if the catalyst composition is used for producing polypropylene [terephtalate] *terephthalate*, the composition is preferably produced in 1,3-propylene glycol. For the production of dioctylphthalate, 2-ethylhexyl alcohol is preferred.

While the individual components can be combined in any order, it is preferred to first combine a complexing agent and titanium compound, generally in a solvent, to produce a first mixture. The first mixture can then be combined with a second complexing agent, if present, to produce a second mixture. Generally the combination for producing the first or second mixture can be stirred and can be carried out at a temperature in the range of from about 0° C. to about 100° C., preferably about 20° C. to about 50° C. Generally any amount of solvent can be used as long as the amount can substantially dissolve the composition and can be in the range of from about 5 to about 50, preferably about 10 to about 30, and most preferably 10 to 20 moles per mole of the titanium compound used in the composition. The first or second mixture is then combined with hypophosphorous acid or its salt to produce the composition of the invention.

The production of the composition is preferably carried out under an inert atmosphere, such as nitrogen, carbon dioxide, helium, or combinations of two or more thereof to avoid liberating a flammable alcohol, if an alcohol is present because of the exothermic nature of the reaction.

The quantities of individual components generally can be such that the molar ratio of each component to titanium in the catalyst compound produced is within the range disclosed above.

According to the second embodiment of the present invention, a process that can be used in, for example, the production of an ester or polyester is provided. The process comprises contacting, in the presence of a catalyst composition, a carbonyl compound with an alcohol. The composition is the same as that disclosed above in the first embodiment of the present invention.

According to the second embodiment of the invention, any carbonyl compound, which when combined with an alcohol, can produce an ester or polyester can be used. Generally, such carbonyl compounds include, but are not limited to, acids, esters, amides, acid anhydrides, acid halides, salts of carboxylic acid oligomers or polymers having repeat units derived from an acid, or combinations of two or more thereof. The presently preferred acid is an organic acid such as a carboxylic acid or salt thereof. The presently preferred process is the polymerization of (1) an acid or an ester and (2) an alcohol or glycol for the production of a polyester.

A preferred process for producing an ester or polyester comprises, consists essentially of, or consists of contacting a reaction medium with a composition disclosed above in the first embodiment of the invention. The reaction medium can comprise, consist essentially of, or consist of an alcohol and either (1) an organic acid, a salt thereof, an ester thereof, or combinations thereof or (2) an oligomer having repeat units derived from an organic acid or ester.

The organic acid or ester thereof can have the formula of $R^2COOR^2$ in which each $R^2$ independently can be (1) hydrogen, (2) hydrocarboxyl radical having a carboxylic acid group at the terminus, or (3) hydrocarbyl radical in which each radical has 1 to about 30, preferably about 3 to about 15 carbon atoms per radical which can be alkyl, alkenyl, aryl, alkaryl, aralkyl radical, or combinations of two or more thereof. The presently preferred organic acid is an organic acid having the formula of $HO_2CA^1CO_2H$ in which $A^1$ is an alkylene group, an arylene group, alkenylene group, or (4) combinations of two or more thereof. Each $A^1$ has about 2 to about 30, preferably about 3 to about 25, more preferably about 4 to about 20, and most preferably 4 to 15 carbon atoms per group. Examples of suitable organic acids include, but are not limited to, terephthalic acid, isophthalic acid, napthalic acid, succinic acid, adipic acid, phthalic acid, glutaric acid, acrylic acid, oxalic acid, benzoic acid, maleic acid, propenoic acid, and combinations of two or more thereof. The presently preferred organic diacid is terephthalic acid because the polyesters produced therefrom have a wide range of industrial applications. Examples of suitable esters include, but are not limited to, dimethyl adipate, dimethyl phthalate, dimethyl terephthalate, methyl benzoate, dimethyl glutarate, and combinations of two or more thereof.

Examples of carboxylic acid metal salts or esters thereof includes a 5-sulfo isophthalate metal salt and its ester having the formula of $(R^3O_2C)_2ArS(O)_2OM^1$ in which each $R^3$ can be the same or different and is hydrogen or an alkyl group containing 1 to about 6, preferably 2, carbon atoms. Ar is a phenylene group. $M^1$ can be an alkali metal ion such as sodium. An example of the ester is bis-glycolate ester of 5-sulfo isophthalate sodium salt.

Any alcohol that can esterify an acid to produce an ester or polyester can be used in the present invention. The presently preferred alcohol has the formula of $R^1(OH)_n$, an alkylene glycol of the formula $(HO)_nA(OH)_n$, or combinations thereof in which $R^1$, A, and n are the same as those disclosed above. Examples of suitable alcohols include, but are not limited to, ethanol, propanol, isopropanol, butanol, ethylene glycol, propylene glycol, isopropylene glycol, butylene glycol, 1-methyl propylene glycol, pentylene glycol, diethylene glycol, triethylene glycol, 2-ethyl hexanol, and combinations of two or more thereof. The presently most preferred alcohol is an alkylene glycol such as ethylene glycol for the polyester produced therefrom has a wide range of industrial applications.

When the carbonyl compound includes a 5-sulfo isophthalate metal salt or its ester as disclosed above, the alcohol is preferably a glycol such as, for example, ethylene glycol, propylene glycol, isopropylene glycol, butylene glycol, 1-methyl propylene glycol, pentylene glycol, diethylene glycol, triethylene glycol, 1,6-hexanediol, cyclohexyl-1,4-bismethanol, and combinations of two or more thereof. The presently most preferred alcohol is an alkylene glycol such as ethylene glycol.

The contacting of a 5-sulfo-isophthalate metal salt or its ester and a glycol produces a bis-glycolate ester of 5-sulfo isophthalate metal salt.

The contacting of the carbonyl compound and alcohol in the presence of the catalyst can be carried out by any suitable means. For example, the carbonyl compound and alcohol can be combined before being contacted with the catalyst. However, it is presently preferred that the catalyst be first dispersed in an alcohol by any suitable means such as mechanical mixing or stirring to produce a dispersion followed by combining the dispersion with (1) a carbonyl compound and (2) an alcohol under a condition sufficient to effect the production of a ester or polyester.

The oligomer of a carbonyl compound and alcohol generally has a total of about 1 to about 100, preferably from about 2 to about 10 repeat units derived from the carbonyl compound and alcohol.

Any suitable condition to effect the production of an ester or polyester can include a temperature in the range of from about 150° C. to about 500° C., preferably about 200° C. to about 400° C., and most preferably 250° C. to 300° C. under a pressure in the range of from about 0.001 to about 1 atmosphere for a time period of from about 0.2 to about 20, preferably about 0.3 to about 15, and most preferably 0.5 to 10 hours.

The molar ratio of the alcohol to carbonyl compound can be any ratio so long as the ratio can effect the production of an ester or polyester. Generally the ratio can be in the range of from about 1:1 to about 10:1, preferably about 1:1 to about 5:1, and [mostpreferably] *most preferably* 1:1 to 4:1.

The catalyst, expressed as Ti or Zr, can be present in the range of about 0.0001 to about 30,000 parts per million by weight (ppmw) of the medium comprising the carbonyl compound and alcohol, preferably about 0.001 to about 1,000 ppmw, and most preferably 0.001 to 100 ppmw. Other ingredients also can be present to enhance catalyst stability or performance.

Further according to the second embodiment of the invention, a process that can be used for producing a cationic dyeable polyalkylene terephthalate is provided. The process comprises contracting a mixture comprising (i) terephthalic acid or dialkyl terephthalate and (ii) 5-sulfoisophthalic acid or ester, its metal salts or the bis-glycolate ester of 5-sulfoisophthalate metal salt produced above, in the presence of the catalyst disclosed above, with a glycol. The bis-glycolate ester of the 5-sulfo isophthalate metal salt is generally present in the mixture in the range of from about 1 to about 5 weight % of the mixture. The scope and quantity of glycol can be the same as those disclosed above.

The catalyst composition can be used in producing esters or polyesters by using any of the conventional melt or solid state techniques. The catalyst compositions are compatible with conventional esterification and transesterification catalysts (e.g., manganese, cobalt, and/or zinc salts) and may be introduced to the production process concurrent with, or following, introduction of the esterification catalyst. The catalyst compositions also have been found to be effective in promoting the esterification reaction, and may be used as a substitute for some or all of the esterification catalyst as well as the polycondensation catalyst.

The following Examples are provided to further illustrate the present invention and are not to be construed as to unduly limit the scope of the invention. All TYZOR® products noted in the examples were obtained from DuPont, Wilmington, Del., USA.

EXAMPLES

Comparative Example 1

A 100 ml flask equipped with an agitator, condenser, dropping funnel and nitrogen bleed was charged with 100 g (0.17 moles) of TYZOR® LA and 60 g (0.34 moles) of sodium benzene phosphonic acid to produce a clear, colorless solution containing 5.1% Ti. TYZOR® LA is an aqueous solution of titanium bis-ammonium lactate prepared by adding two moles of lactic acid to TYZOR® TPT followed by addition of water, removal of by-product isopropyl alcohol and neutralization with 28% aqueous ammonium hydroxide solution. TYZOR® TPT is tetraisopropyl titanate. Both TYZOR® LA and TYZOR® TPT are available from E.I. du Pont de Nemours & Company, Wilmington, Del., USA.

Comparative Example 2

A 250 ml flask equipped as in comparative example 1 was charged with 61.3 g (0.319 moles) of citric acid and 46.4 g of water. Agitation was started and 36 g (0.127 moles) of TYZOR® TPT was added dropwise to produce a mixture. The mixture was heated to reflux and held 1 hour during which time 50 g of distillate was removed via Dean-Starke trap. The remaining mixture was cooled to 70° C. and 47.5 g (0.38 moles) of 32% aqueous sodium hydroxide solution was added. The resultant solution was filtered and 63 g of ethylene glycol was added to the filtrate. The ethylene glycol-containing solution was stripped on a rotovaporizer under 20 mm Hg vacuum to give 137.5 g of a viscous solution, which was diluted with 63 g of ethylene glycol to give 200 gm of a pale yellow liquid containing 3% Ti.

Example 1

A 250 ml flask equipped with an agitator, N2 inlet, heating mantle, dropping funnel and condenser was charged with 100 g (0.17 moles) of TYZOR® LA. Agitation was started and 45 g (0.34 moles) of 50% aqueous solution of hypophosphorous acid was added. The reaction mass was agitated at room temperature for 2 hours to give 145 g of a colorless, clear solution containing 5.8% Ti.

Example 2

Example 1 was repeated using 106.4 g (0.17 moles) of TYZOR® LA sodium salt and 45 gm (0.34 moles) of a 50% aqueous solution of hypophosphorous acid to give 151.4 gm of a colorless, clear solution containing 5.4% Ti. The solution of TYZOR® LA sodium salt (titanium sodium lactate) was prepared by adding two moles of lactic acid to TYZOR® TPT followed by addition of water, removal of by-product isopropyl alcohol, and neutralization with 23.4% by weight sodium hydroxide solution.

Example 3

Example 1 was repeated using 100 g (0.17 moles) of TYZOR® LA and 72 g (0.34 moles) of a 50% aqueous solution of sodium hypophosphite to give a colorless, clear solution containing 4.8% Ti.

Example 4

Example 1 was repeated using 100 g (0.17 moles) of TYZOR® LA and 33.8 g (0.26 moles) of a 50% aqueous solution of hypophosphorous acid to give 133.8 g of a colorless, clear solution containing 6.1% Ti.

Example 5

Example 1 was repeated using 106.4 g (0.17 moles) of an aqueous solution of titanium bis-sodium lactate to 33.7 g (0.26 moles) of a 50% aqueous solution of hypophosphorous acid to give 140.1 g of a colorless, clear solution containing 6.2% Ti. The solution of titanium bis-sodium lactate was prepared by adding two moles of lactic acid to TYZOR® TPT followed by addition of water, removal of by-product isopropyl alcohol, and neutralization with 23.4% by weight sodium hydroxide solution.

Example 6

Example 1 was repeated using 100 g (0.17 moles) of TYZOR® LA and 53.8 g (0.26 moles) of a 50% aqueous solution of sodiumhypophosphite to give 153.8 g of a colorless, clear solution containing 5.3% Ti.

Example 7

Example 1 was repeated using 100 g (0.17 moles) of TYZOR® LA and 22.5 g (0.26 moles) of a 50% aqueous solution of hypophosphorous acid to give 122.5 g of a colorless, clear solution containing 6.7% Ti.

Example 8

Example 1 was repeated using 106.4 g (0.17 moles) of an aqueous solution of titanium bis-sodium lactate and 22.5 g (0.17 moles) of a 50% aqueous solution of hypophosphorous acid to give 128.9 g of a colorless, clear solution containing 25 6.7% Ti.

Example 9

Example 1 was repeated using 100 g (0.17 moles) of TYZOR® LA and 36 g (0.17 moles) of a 50% aqueous solution of sodium hypophosphite to give 136 g of a colorless, clear solution containing 6% Ti.

Example 10

A 100 ml flask equipped as in example 1 was charged with 14.2 g (0.05 moles) of TYZOR® TPT. Agitation was started and 14.9 g (0.1 moles) of triethanolamine was added dropwise. When addition was complete, 13.2 g (0.1 moles) of 50% aqueous hypophosphorous acid solution was added dropwise. The reaction mixture was stirred two hours to give 42.3 g of a clear, colorless solution containing 5.8% Ti.

Example 11

The process for producing terephthalic acid oligomer is illustrated as follows. An autoclave was charged with 100 pounds (45.4 Kg) of terephthalic acid and 67 pounds (30.4 Kg) of ethylene glycol. The batch was heated to 240° C. at an agitation speed of 15 rpm, and 21.6 lbs. (9.8 Kg) of water and 14.3 lbs. (6.5 Kg) of ethylene glycol removed. The charge was then heated to 275° C. over the course of 90 minutes, and the remaining ethylene glycol removed at 285° C. and below 2 mm Hg vacuum. Once the condensation mass was judged to be complete, the molten mass was extruded into an aqueous bath to solidify the product. The resultant oligomer was dried to remove residual moisture before use.

Color of the resulting oligomer and any polymer produced therefrom was measured in terms of the L-value and b-value, using an instrument such as the SP-78 Spectrophotometer. The L-value shows brightness, with the greater the numerical value showing higher (desirable) brightness. The b-value shows the degree of yellowness, with a higher numerical value showing a higher (undesirable) degree of yellowness.

A 1-liter resin kettle was provided with a Jiffy Mixer agitator rotating at 40 rpm, a thermocouple, condenser and nitrogen sweep. To this kettle was added the catalyst to be tested, 115 ml of ethylene glycol, and 400 g of terephthalic acid oligomer prepared above. The agitator was turned on and the temperature was increased to 275° C. over a period of about 2.5 hours. The contents were polymerized by holding under agitation at 275° C. and a pressure of 120 mm Hg for 20 minutes, and at 280° C. and a pressure of 30 mm Hg for an additional 20 minutes. The contents were then held under agitation at 285° C. at 1 to 2 mm Hg pressure for a time sufficient to reach 15 ounce-inch (0.106 Newton-meter) torque as measured by an Electro-Craft Motomatic torque controller. The time for this step was recorded as the Finish Time, and varied with the catalyst used. The polymer melt was then poured into a water bath to solidify the melt, and the resultant solid annealed at 150° C. for 12 hours and ground to pass through a 2 mm filter for color measurements using the previously described spectrophotometer. Results comparing the color as mentioned spectrophotometrically are given in Table 1 below.

TABLE 1

| Examples | ppm | L | b |
|---|---|---|---|
| Antimony Glycolate[A] | 300 Sb | 75.66 | 6.07 |
| TYZOR ® TPT[B] | 25 Ti | 70.68 | 10.54 |
| TYZOR ® LA[C] | 25 Ti | 72.39 | 10.96 |
| 1-TYZOR ® LA/$H_3PO_2$(2/1)[D] | 25 Ti | 70.22 | 5.36 |
| 2-TYZOR ® LA(Na salt)/$H_3PO_2$(2/1) | 25 Ti | 74.64 | 5.00 |
| 3-TYZOR ® LA/$NaH_2PO_2$(2/1) | 25 Ti | 71.67 | 4.94 |
| 4-TYZOR ® LA/$H_3PO_2$(1.5/1) | 25 Ti | 73.11 | 8.96 |
| 5-TYZOR ® LA(Na salt)/$H_3PO_2$(1.5/1) | 25 Ti | 72.42 | 7.94 |
| 6-TYZOR ® LA/$NaH_2PO_2$(1.5/1) | | | |
| 7-TYZOR ® LA/$H_3PO_2$(1/1) | 25 Ti | 72.38 | 8.73 |
| 8-TYZOR ® LA(Na salt)/$H_3PO_2$(1/1) | 25 Ti | 72.41 | 8.48 |
| 9-TYZOR ® LA/$NaH_2PO_2$(1/1) | 25 Ti | 75.02 | 8.40 |
| 10-Triethanolamine titanate/$H_3PO_2$(1/2) | 25 Ti | 72.33 | 6.49 |
| Comp. Exam 1-TYZOR ® LA/BPANa(2/1) | 25 Ti | 70.66 | 11.11 |
| Comp. Exam 2-Titanium sodium citrate | 25 Ti | 68.40 | 11.46 |

[A], [B], and [C]Control runs

[D]The ratios in the parentheses are molar ratios of titanium complex to phosphorus compound.

Table 1 shows that polyesters produced using a catalyst comprising titanium and hypophosphorous acid or its salt (Examples 1–10) had considerably lower b values, i.e., less yellowness, than those produced using a titanium compound without the hypophosphorous acid or its salt. Table 1 further shows that the polyester produced using a catalyst containing titanium, benzenephosphonic acid, sodium salt (comparative example 1), and an organophosphorus compound had an undesirably high b value of 11.11 and 11.46, respectively. Control run using TYZOR® LA and comparative example 2 show that titanium (x-hydroxycarboxylic acid complexes with or without a base gives higher b color values than those containing hypophosphorous acid or its salt.

What is claimed is:

[1. A composition comprising a titanium compound, a complexing agent, and an aqueous solution of hypophosphorous acid or a salt thereof wherein said complexing agent is selected from the group consisting of hydroxycarboxylic acids, alkanolamines, aminocarboxylic acids, and combinations of two or more thereof.]

[2. A composition according to claim 1 wherein said titanium compound has the formula $Ti(OR)_4$ and each R is independently selected from the group consisting of an alkyl radical, a cycloalkyl radical, aralkyl radical, and combinations of two or more thereof and contains from 1 to about 30 carbon atoms per radical.]

[3. A composition according to claim 1 wherein said titanium compound is selected from the group consisting of tetra isopropyl titanate, tetra n-butyl titanate, and combinations thereof.]

[4. A composition according to claim 1 further comprising a solvent.]

[5. A composition according to claim 4 wherein said solvent is selected from the group consisting of water, ethanol, propanol, isopropanol, butanol, ethylene glycol, propylene glycol, isopropylene glycol, butylene glycol, 1-methyl propylene glycol, pentylene glycol, and combinations of two or more thereof.]

[6. A composition according to claim 4 wherein said solvent is selected from the group consisting of water, ethylene glycol, and combinations thereof.]

[7. A composition according to claim 1 wherein said titanium compound has the formula $Ti(OR)_4$, each R is independently selected from the group consisting of an alkyl radical, a cycloalkyl radical, aralkyl radical, and combinations of two or more thereof and contains from 1 to about 30 carbon atoms per radical;

said complexing agent is selected from the group consisting of a hydroxycarboxylic acid, an alkanolamine and combinations thereof, and said composition further comprises a solvent selected from the group consisting of water, ethanol, propanol, isopropanol, butanol, ethylene glycol, propylene glycol, isopropylene glycol, butylene glycol, 1-methyl propylene glycol, pentylene glycol, and combinations of two or more thereof.]

[8. A composition according to claim 7 wherein said titanium compound is selected from the group consisting of tetra isopropyl titanate, tetra n-butyl titanate, and combinations thereof; and said solvent is selected from the group consisting of water, ethylene glycol, and combinations thereof.]

[9. A composition according to any of claims 4 to 8 wherein said solvent is water.]

[10. A composition according to any of claims 4 to 8 wherein said solvent is ethylene glycol.]

[11. A composition according to claim 9 wherein said solvent further comprises ethylene glycol.]

[12. A composition according to any of claims 1–8 and 11 wherein said titanium compound is combined with a zirconium compound.]

[13. A composition according to claim 9 wherein said titanium compound is combined with a zirconium compound.]

[14. A composition according to claim 10 wherein said titanium compound is combined with a zirconium compound.]

[15. A composition according to claim 12 wherein said zirconium compound is selected from the group consisting of zirconium tetraethoxide, zirconium tetrapropoxide, zirconium tetraisopropoxide, zirconium tetra-n-butoxide, zirconium tetrahexoxide, zirconium tetra 2-ethylhexoxide, zirconium tetraoctoxide, and combinations of two or more thereof.]

[16. A composition according to claim 13, 14, or 15 wherein said zirconium compound is selected from the group consisting of zirconium tetraethoxide, zirconium tetrapropoxide, zirconium tetraisopropoxide, zirconium tetra-n-butoxide, zirconium tetrahexoxide, zirconium tetra 2-ethylhexoxide, zirconium tetraoctoxide, and combinations of two or more thereof.]

[17. A composition according to claim 16 wherein the molar ratio of Ti/Zr is in the range of from about 0.001:1 to about 10:1.]

[18. A composition according to any of claims 1–8, 11, 13, 14, 15, and 17 wherein said complexing agent is selected from the group consisting of an α-hydroxycarboxylic acid, an α-aminocarboxylic acid, an alkanolamine, and combinations of two or more thereof.]

[19. A composition according to claim 9 wherein said complexing agent is selected from the group consisting of an α-hydroxycarboxylic acid, an α-aminocarboxylic acid, an alkanolamine, and combinations of two or more thereof.]

[20. A composition according to claim 10 wherein said complexing agent is selected from the group consisting of an α-hydroxycarboxylic acid, an α-aminocarboxylic acid, an alkanolamine, and combinations of two or more thereof.]

[21. A composition according to claim 16 wherein said complexing agent is selected from the group consisting of an α-hydroxycarboxylic acid, an α-aminocarboxylic acid, an alkanolamine, and combinations of two or more thereof.]

[22. A composition according to any of claims 1–8, 11, 13, 14, 15, and 17 wherein said complexing agent is selected from the group consisting of lactic acid, glycolic acid, citric acid, tartaric acid, malic acid, diethanolamine, triethanolamine, tetrahydroxyisopropylethylenediamine, glycine, bis-hydroxyethyl glycine, hydroxyethyl glycine, and combinations of two or more thereof.]

[23. A composition according to claim 19, 20, or 21 wherein said complexing agent is selected from the group consisting of lactic acid, glycolic acid, citric acid, tartaric acid, malic acid, diethanolamine, triethanolamine, tetrahydroxyisopropylethylenediamine, glycine, bis-hydroxyethyl glycine, hydroxyethyl glycine, and combinations of two or more thereof.]

[24. A composition according to any of claims 1 to 3 and wherein said composition is produced by combining said organic titanium compound, said complexing agent, and said hypophosphorous acid or its salt; and said complexing agent is selected from the group consisting of hydroxycarboxylic acids, aminocarboxylic acids, alkanolamines, and combinations of two or more thereof.]

[25. A composition according to claim 24 further comprising combining said titanium compound, said complexing agent, and said hypophosphorous acid or its salt with a solvent selected from the group consisting of water, ethanol, propanol, isopropanol, butanol, ethylene glycol, propylene glycol, isopropylene glycol, butylene glycol, 1-methyl propylene glycol, pentylene glycol, and combinations of two or more thereof.]

[26. A composition according to claim 25 wherein said titanium compound is selected from the group consisting of tetra isopropyl titanate, tetra n-butyl titanate, and combinations thereof, complexing agent is selected from the group consisting of lactic acid, glycolic acid, citric acid, tartaric acid, malic acid, diethanolamine, triethanolamine, tetrahydroxyisopropylethylenediamine, and combinations of two or more thereof; and said solvent is selected from the group consisting of water, ethylene glycol, and combinations thereof.]

[27. A composition according to claim 25 or 26 wherein said titanium compound is combined with a zirconium compound selected from the group consisting of zirconium tetraethoxide, zirconium tetrapropoxide, zirconium tetraisopropoxide, zirconium tetra-n-butoxide, zirconium tetrahexoxide, zirconium tetra 2-ethylhexoxide, zirconium tetraoctoxide, and combinations of two or more thereof.]

[28. A composition comprising a titanium compound, a complexing agent, and hypophosphorous acid or a salt thereof, and a solvent wherein said titanium compound has the formula $Ti(OR)_4$, each R is independently selected from the group consisting of an alkyl radical, a cycloalkyl radical, aralkyl radical, and combinations of two or more thereof and contains from 1 to about 30 carbon atoms per radical;

said complexing agent is selected from the group consisting of a hydroxycarboxylic acid, alkanolamines, and combinations thereof; and said solvent is selected from the group consisting of water, ethanol, propanol, isopropanol, butanol, ethylene glycol, propylene glycol, isopropylene glycol, butylene glycol, 1-methyl propylene glycol, pentylene glycol, and combinations of two or more thereof.]

[29. A composition according to claim 28 wherein said titanium compound is selected from the group consisting of tetra isopropyl titanate, tetra n-butyl titanate, and combinations thereof; said complexing agent is selected from the group consisting of lactic acid, glycolic acid, citric acid, tartaric acid, malic acid, diethanolamine, triethanolamine, tetrahydroxyisopropylethylenediamine, and combinations of two or more thereof; and said solvent is selected from the group consisting of water, ethylene glycol, and combinations thereof.]

[30. A composition according to claim 28 or 29 wherein said solvent is water.]

[31. A composition according to claim 30 wherein said solvent further comprises ethylene glycol.]

[32. A composition according to claim 29 or 31 wherein said titanium compound is combined with a zirconium compound selected from the group consisting of zirconium tetraethoxide, zirconium tetrapropoxide, zirconium tetraisopropoxide, zirconium tetra-n-butoxide, zirconium tetrahexoxide, zirconium tetra 2-ethylhexoxide, zirconium tetraoctoxide, and combinations of two or more thereof.]

[33. A composition comprising a titanium compound, a complexing agent, and hypophosphorous acid or a salt thereof, and a solvent wherein said titanium compound is selected from the group consisting of tetra isopropyl titanate, tetra n-butyl titanate, and combinations thereof;

said complexing agent is selected from the group consisting of lactic acid, glycolic acid, citric acid, tartaric acid, malic acid, diethanolamine, triethanolamine, tetrahydroxyisopropylethylenediamine, and combinations of two or more thereof; and said solvent is selected from the group consisting of water, ethylene glycol, and combinations thereof.]

[34. A composition according to claim 33 wherein said solvent is water.]

[35. A composition according to claim 34 wherein said solvent further comprises ethylene glycol.]

[36. A composition comprising a titanium complex and hypophosphorous acid or its salt wherein said titanium complex is a complex of a titanium compound and a complexing agent wherein said titanium compound has the formula $Ti(OR)_4$, each R is independently selected from the group consisting of an alkyl radical, a cycloalkyl radical, aralkyl radical, and combinations of two or more thereof and contains from 1 to about 30 carbon atoms per radical; and said complexing agent is selected from the group consisting of an α-hydroxycarboxylic acid, alkanolamines, aminocarboxylic acids, and combinations of two or more thereof.]

[37. A composition according to claim 36 wherein said titanium compound is selected from the group consisting of tetra isopropyl titanate, tetra n-butyl titanate, and combinations thereof; and said complexing agent is selected from the group consisting of lactic acid, glycolic acid, citric acid, tartaric acid, malic acid, diethanolamine, triethanolamine, tetrahydroxyisopropylethylenediamine, and combinations of two or more thereof.]

[38. A composition according to claim 36 or 37 wherein said composition further comprises a solvent selected from the group consisting of water, ethanol, propanol, isopropanol, butanol, ethylene glycol, propylene glycol, isopropylene glycol, butylene glycol, 1-methyl propylene glycol, pentylene glycol, and combinations of two or more thereof.]

[39. A composition according to claim 38 said solvent is selected from the group consisting of water, ethanol, and combinations thereof.]

[40. A composition according to claim 39 wherein said titanium complex is TYZOR® LA(bis-ammonium lactate titanate).]

[41. A process comprising contacting, in the presence of a catalyst composition, a carbonyl compound and an alcohol wherein said catalyst comprises a titanium compound, a complexing agent, and hypophosphorous acid or its salt wherein said complexing agent is selected from the group consisting of hydroxycarboxylic acids, alkanolamines, aminocarboxylic acids, and combinations of two or more thereof.]

[42. A process according to claim 41 wherein said titanium compound has the formula $Ti(OR)_4$ and each R is independently selected from the group consisting of an alkyl radical, a cycloalkyl radical, aralkyl radical, and combinations of two or more thereof and contains from 1 to about 30 carbon atoms per radical.]

[43. A process according to claim 41 wherein said titanium compound is selected from the group consisting of tetra isopropyl titanate, tetra n-butyl titanate, and combinations thereof.]

[44. A process according to claim 41, 42, or 43 wherein said catalyst further comprises a solvent selected from the group consisting of water, ethanol, propanol, isopropanol, butanol, ethylene glycol, propylene glycol, isopropylene glycol, butylene glycol, 1-methyl propylene glycol, pentylene glycol, and combinations of two or more thereof.]

[45. A process according to claim 44 wherein said solvent is selected from the group consisting of water, ethylene glycol, and combinations thereof.]

[46. A process according to claim 41 wherein said titanium compound has the formula $Ti(OR)_4$ wherein each R is independently selected from the group consisting of an alkyl radical, a cycloalkyl radical, aralkyl radical, and combinations of two or more thereof and contains from 1 to about 30 carbon atoms per radical;

said complexing agent is selected from the group consisting of α-hydroxycarboxylic acids, alkanolamines, and combinations thereof; and said catalyst further comprises a solvent selected from the group consisting of ethanol, propanol, isopropanol, butanol, ethylene glycol, propylene glycol, isopropylene glycol, butylene glycol, 1-methyl propylene glycol, pentylene glycol, and combinations of two or more thereof.]

[47. A process according to claim 46 wherein said titanium compound is selected from the group consisting of tetra isopropyl titanate, tetra n-butyl titanate, and combinations thereof, said complexing agent is selected from the group consisting of lactic acid, glycolic acid, citric acid, tartaric acid, malic acid, diethanolamine, triethanolamine, tetrahydroxyisopropylethylenediamine, and combinations of two or more thereof; and said solvent is selected from the group consisting of water, ethylene glycol, and combinations thereof.]

[48. A process according to claim 41 wherein said catalyst composition is a titanium complex produced by combining a titanium compound and a complexing agent; said titanium compound is selected from the group consisting of tetra isopropyl titanate, tetra n-butyl titanate, and combinations thereof; and said complexing agent selected from the group consisting of lactic acid, glycolic acid, citric acid, tartaric acid, malic acid, diethanolamine, triethanolamine, tetrahydroxyisopropylethylenediamine, and combinations of two or more thereof.]

[49. A process according to claim 48 wherein said catalyst composition further comprises combining said titanium complex and said hypophosphorous acid or its salt with a solvent selected from the group consisting of water, ethylene glycol, and combinations thereof.]

[50. A process according to any of claims 41–43 and 45 to 49 wherein said carbonyl compound has the formula of $R^2COOR^2$; each $R^2$ is independently selected from the group consisting of (1) hydrogen, (2) hydrocarboxyl radical having a carboxylic acid group at the terminus, or (3) hydrocarbyl radical in which each radical has 1 to about 30 carbon atoms per radical which is alkyl, alkenyl, aryl, alkaryl, or aralkyl radical, (4) a 5-sulfo isophthalate metal salt or its ester, and (5) combinations of two or more thereof.]

[51. A process according to claim 50 wherein said alcohol is selected from the group consisting of ethylene glycol, propylene glycol, isopropylene glycol, butylene glycol, 1-methyl propylene glycol, pentylene glycol, and combinations of two or more thereof.]

[52. A process according to claim 51 wherein said alcohol is ethylene glycol.]

[53. A process according to claim 50 wherein said carbonyl compound is selected from the group consisting of terephthalic acid, dimethyl terephthalate, isophthalic acid, naphthalic acid, succinic acid, adipic acid, phthalic acid, glutaric acid, acrylic acid, oxalic acid, benzoic acid, maleic acid, propenoic acid, bis-glycolate ester of 5-sulfo isophthalate sodium salt, and combination of two or more thereof.]

[54. A process according to claim 51 or 52 wherein said carbonyl compound is selected from the group consisting of terephthalic acid, dimethyl terephthalate, isophthalic acid, naphthalic acid, succinic acid, adipic acid, phthalic acid, glutaric acid, acrylic acid, oxalic acid, benzoic acid, maleic acid, propenoic acid, bis-glycolate ester of 5-sulfo isophthalate sodium salt, and combination of two or more thereof.]

[55. A process according to claim 51, 52, or 53 wherein said carbonyl compound is terephthalic acid.]

[56. A process according to claim 55 wherein said carbonyl compound comprises a mixture of terephthalic acid and bis-glycolate ester of 5-sulfo isophthalate sodium salt.]

*57. A composition comprising, or produced by combining, a titanium compound, a complexing agent, and an aqueous solution of hypophosphorous acid or a salt thereof wherein said complexing agent is selected from the group consisting of hydroxycarboxylic acids, alkanolamines, aminocarboxylic acids, and combinations of two or more thereof.*

*58. A composition according to claim 57 wherein said titanium compound has the formula* $Ti(OR)_4$ *and each R is independently selected from the group consisting of an alkyl radical, a cycloalkyl radical, an aralkyl radical, and combinations of two or more thereof and contains from 1 to about 30 carbon atoms per radical.*

*59. A composition according to claim 57 wherein said titanium compound is selected from the group consisting of tetra isopropyl titanate, tetra n-butyl titanate, and combinations thereof.*

*60. A composition according to claim 57 further comprising a solvent.*

*61. A composition according to claim 60 wherein said solvent is selected from the group consisting of water, ethanol, propanol, isopropanol, butanol, ethylene glycol, propylene glycol, isopropylene glycol, butylene glycol, 1-methyl propylene glycol, pentylene glycol, and combinations of two or more thereof.*

*62. A composition according to claim 60 wherein said solvent is selected from the group consisting of water, ethylene glycol, and combinations thereof.*

*63. A composition according to claim 57 wherein*

*said titanium compound has the formula* $Ti(OR)_4$*, each R is independently selected from the group consisting of an alkyl radical, a cycloalkyl radical, aralkyl radical, and combinations of two or more thereof and contains from 1 to about 30 carbon atoms per radical;*

*said complexing agent is selected from the group consisting of a hydroxycarboxylic acid, an aminocarboxylic acid, an alkanolamine and combinations of two or more thereof; and*

*said composition further comprises a solvent selected from the group consisting of water, ethanol, propanol, isopropanol, butanol, ethylene glycol, propylene glycol, isopropylene glycol, butylene glycol, 1-methyl propylene glycol, pentylene glycol, and combinations of two or more thereof.*

*64. A composition according to claim 63 wherein said titanium compound is selected from the group consisting of tetra isopropyl titanate, tetra n-butyl titanate, and combinations thereof; and said solvent is selected from the group consisting of water, ethylene glycol, and combinations thereof.*

*65. A composition according to any of claims 57 to 59 and 61 to 64 wherein said solvent is water.*

*66. A composition according to any of claims 57 to 59 and 61 to 64 wherein said solvent is ethylene glycol.*

*67. A composition according to claim 66 wherein said solvent further comprises water.*

*68. A composition according to any of claims 57 to 64 wherein said titanium compound is combined with a zirconium compound.*

*69. A composition according to claim 65 wherein said titanium compound is combined with a zirconium compound.*

*70. A composition according to claim 66 wherein said titanium compound is combined with a zirconium compound.*

*71. A composition according to claim 67 wherein said titanium compound is combined with a zirconium compound.*

*72. A composition according to claim 68 wherein said zirconium compound is selected from the group consisting of zirconium tetraethoxide, zirconium tetrapropoxide, zirconium tetraisopropoxide, zirconium tetra-n-butoxide, zirconium tetrahexoxide, zirconium tetra 2-ethylhexoxide, zirconium tetraoctoxide, and combinations of two or more thereof.*

*73. A composition according to claim 69 wherein said zirconium compound is selected from the group consisting of zirconium tetraethoxide, zirconium tetrapropoxide, zirconium tetraisopropoxide, zirconium tetra-n-butoxide, zirconium tetrahexoxide, zirconium tetra 2-ethylhexoxide, zirconium tetraoctoxide, and combinations of two or more thereof.*

*74. A composition according to claim 70 wherein said zirconium compound is selected from the group consisting of zirconium tetraethoxide, zirconium tetrapropoxide, zirconium tetraisopropoxide, zirconium tetra-n-butoxide, zirconium tetrahexoxide, zirconium tetra 2-ethylhexoxide, zirconium tetraoctoxide, and combinations of two or more thereof.*

*75. A composition according to claim 71 wherein said zirconium compound is selected from the group consisting of zirconium tetraethoxide, zirconium tetrapropoxide, zirconium tetraisopropoxide, zirconium tetra-n-butoxide, zirconium tetrahexoxide, zirconium tetra 2-ethylhexoxide, zirconium tetraoctoxide, and combinations of two or more thereof.*

*76. A composition according to claim 72 wherein the molar ratio of Ti/Zr is in the range of from about 0.001:1 to about 10:1.*

*77. A composition according to claim 73 wherein the molar ratio of Ti/Zr is in the range of from about 0.001:1 to about 10:1.*

*78. A composition according to claim 64 wherein the molar ratio of Ti/Zr is in the range of from about 0.001:1 to about 10:1.*

*79. A composition according to claim 75 wherein the molar ratio of Ti/Zr is in the range of from about 0.001:1 to about 10:1.*

*80. A composition according to any of claims 57 to 62 wherein said complexing agent is selected from the group*

*consisting of an α-hydroxycarboxylic acid, an α-aminocarboxylic acid, an alkanolamine, and combinations of two or more thereof.*

*81. A composition according to claim 65 wherein said complexing agent is selected from the group consisting of an α-hydroxycarboxylic acid, an α-aminocarboxylic acid, an alkanolamine, and combinations of two or more thereof.*

*82. A composition according to claim 66 wherein said complexing agent is selected from the group consisting of an α-hydroxycarboxylic acid, an α-aminocarboxylic acid, an alkanolamine, and combinations of two or more thereof.*

*83. A composition according to claim 67 wherein said complexing agent is selected from the group consisting of an α-hydroxycarboxylic acid, an α-aminocarboxylic acid, an alkanolamine, and combinations of two or more thereof.*

*84. A composition according to claim 68 wherein said complexing agent is selected from the group consisting of an α-hydroxycarboxylic acid, an α-aminocarboxylic acid, an alkanolamine, and combinations of two or more thereof.*

*85. A composition according to claim 69 wherein said complexing agent is selected from the group consisting of an α-hydroxycarboxylic acid, an α-aminocarboxylic acid, an alkanolamine, and combinations of two or more thereof.*

*86. A composition according to claim 70 wherein said complexing agent is selected from the group consisting of an α-hydroxycarboxylic acid, an α-aminocarboxylic acid, an alkanolamine, and combinations of two or more thereof.*

*87. A composition according to claim 71 wherein said complexing agent is selected from the group consisting of an α-hydroxycarboxylic acid, an α-aminocarboxylic acid, an alkanolamine, and combinations of two or more thereof.*

*88. A composition according to any of claims 57 to 64 wherein said complexing agent is selected from the group consisting of lactic acid, glycolic acid, citric acid, tartaric acid, malic acid, diethanolamine, triethanolamine, tetrahydroxyisopropylethylenediamine, glycine, bis-hydroxyethyl glycine, hydroxyethyl glycine, and combinations of two or more thereof.*

*89. A composition according to claim 65 wherein said complexing agent is selected from the group consisting of lactic acid, glycolic acid, citric acid, tartaric acid, malic acid, diethanolamine, triethanolamine, tetrahydroxyisopropylethylenediamine, glycine, bis-hydroxyethyl glycine, hydroxyethyl glycine, and combinations of two or more thereof.*

*90. A composition according to claim 66 wherein said complexing agent is selected from the group consisting of lactic acid, glycolic acid, citric acid, tartaric acid, malic acid, diethanolamine, triethanolamine, tetrahydroxyisopropylethylenediamine, glycine, bis-hydroxyethyl glycine, hydroxyethyl glycine, and combinations of two or more thereof.*

*91. A composition according to claim 67 wherein said complexing agent is selected from the group consisting of lactic acid, glycolic acid, citric acid, tartaric acid, malic acid, diethanolamine, triethanolamine, tetrahydroxyisopropylethylenediamine, glycine, bis-hydroxyethyl glycine, hydroxyethyl glycine, and combinations of two or more thereof.*

*92. A composition according to claim 76 wherein said complexing agent is selected from the group consisting of lactic acid, glycolic acid, citric acid, tartaric acid, malic acid, diethanolamine, triethanolamine, tetrahydroxyisopropylethylenediamine, glycine, bis-hydroxyethyl glycine, hydroxyethyl glycine, and combinations of two or more thereof.*

*93. A composition according to claim 77 wherein said complexing agent is selected from the group consisting of lactic acid, glycolic acid, citric acid, tartaric acid, malic acid, diethanolamine, triethanolamine, tetrahydroxyisopropylethylenediamine, glycine, bis-hydroxyethyl glycine, hydroxyethyl glycine, and combinations of two or more thereof.*

*94. A composition according to claim 78 wherein said complexing agent is selected from the group consisting of lactic acid, glycolic acid, citric acid, tartaric acid, malic acid, diethanolamine, triethanolamine, tetrahydroxyisopropylethylenediamine, glycine, bis-hydroxyethyl glycine, hydroxyethyl glycine, and combinations of two or more thereof.*

*95. A composition according to claim 79 wherein said complexing agent is selected from the group consisting of lactic acid, glycolic acid, citric acid, tartaric acid, malic acid, diethanolamine, triethanolamine, tetrahydroxyisopropylethylenediamine, glycine, bis-hydroxyethyl glycine, hydroxyethyl glycine, and combinations of two or more thereof.*

*96. A composition according to any of claims 57 to 59 and wherein said composition is produced by combining said organic titanium compound, said complexing agent, and said hypophosphorous acid or its salt; and said complexing agent is selected from the group consisting of hydroxycarboxylic acids, aminocarboxylic acids, alkanolamines, and combinations of two or more thereof.*

*97. A composition according to claim 96 further comprising combining said titanium compound, said complexing agent, and said hypophosphorous acid or its salt with a solvent selected from the group consisting of water, ethanol, propanol, isopropanol, butanol, ethylene glycol, propylene glycol, isopropylene glycol, butylene glycol, 1-methyl propylene glycol, pentylene glycol, and combinations of two or more thereof.*

*98. A composition according to claim 97 wherein said titanium compound is selected from the group consisting of tetra isopropyl titanate, tetra n-butyl titanate, and combinations thereof; complexing agent is selected from the group consisting of lactic acid, glycolic acid, citric acid, tartaric acid, malic acid, diethanolamine, triethanolamine, tetrahydroxyisopropylethylenediamine, glycine, bis-hydroxyethyl glycine, hydroxyethyl glycine, and combinations of two or more thereof; and said solvent is selected from the group consisting of water, ethylene glycol, and combinations thereof.*

*99. A composition according to claim 97 wherein said titanium compound is further combined with a zirconium compound selected from the group consisting of zirconium tetraethoxide, zirconium tetrapropoxide, zirconium tetraisopropoxide, zirconium tetra-n-butoxide, zirconium tetrahexoxide, zirconium tetra 2-ethylhexoxide, zirconium tetraoctoxide, and combinations of two or more thereof.*

*100. A composition according to claim 98 wherein said titanium compound is further combined with a zirconium compound selected from the group consisting of zirconium tetraethoxide, zirconium tetrapropoxide, zirconium tetraisopropoxide, zirconium tetra-n-butoxide, zirconium tetrahexoxide, zirconium tetra 2-ethylhexoxide, zirconium tetraoctoxide, and combinations of two or more thereof.*

*101. A composition comprising, or produced by combining, a titanium compound, a complexing agent, and hypophosphorous acid or a salt thereof, and a solvent wherein*

*said titanium compound has the formula $Ti(OR)_4$, each R is independently selected from the group consisting of an alkyl radical, a cycloalkyl radical, aralkyl radical, and combinations of two or more thereof and contains from 1 to about 30 carbon atoms per radical;*

*said complexing agent is selected from the group consisting of hydroxycarboxylic acids, an aminocarboxylic acid, an alkanolamine and combinations of two or more thereof; and*

*said solvent is selected from the group consisting of water, ethanol, propanol, isopropanol, butanol, ethylene glycol, propylene glycol, isopropylene glycol, butylene glycol, 1-methyl propylene glycol, pentylene glycol, and combinations of two or more thereof.*

*102. A composition according to claim 101 wherein said titanium compound is selected from the group consisting of tetra isopropyl titanate, tetra n-butyl titanate, and combinations thereof; said complexing agent is selected from the group consisting of lactic acid, glycolic acid, citric acid, tartaric acid, malic acid, diethanolamine, triethanolamine, tetrahydroxyisopropylethylenediamine, glycine, bis-hydroxyethyl glycine, hydroxyethyl glycine, and combinations of two or more thereof.*

*103. A composition according to claim 101 wherein said solvent is water.*

*104. A composition according to claim 102 wherein said solvent is water.*

*105. A composition according to claim 103 wherein said solvent further comprises ethylene glycol.*

*106. A composition according to claim 104 wherein said solvent further comprises ethylene glycol.*

*107. A composition according to any of claims 102 to 106 wherein said titanium compound is further combined with a zirconium compound selected from the group consisting of zirconium tetraethoxide, zirconium tetrapropoxide, zirconium tetraisopropoxide, zirconium tetra-n-butoxide, zirconium tetrahexoxide, zirconium tetra 2-ethylhexoxide, zirconium tetraoctoxide, and combinations of two or more thereof.*

*108. A composition comprising, or produced by combining, a titanium compound, a complexing agent, a solvent, and optionally hypophosphorous acid or a salt thereof wherein*

*said titanium compound is selected from the group consisting of tetra isopropyl titanate, tetra n-butyl titanate, and combinations thereof;*

*said complexing agent is selected from the group consisting of lactic acid, glycolic acid, citric acid, tartaric acid, malic acid, diethanolamine, triethanolamine, tetrahydroxyisopropylethylenediamine, glycine, bis-hydroxyethyl glycine, hydroxyethyl glycine, and combinations of two or more thereof;*

*said solvent is selected from the group consisting of water, ethylene glycol, and combinations thereof; and*

*said hypophosphorous acid or a salt thereof is sodium hypophosphite.*

*109. A composition according to claim 108 wherein said solvent is water.*

*110. A composition according to claim 109 wherein said solvent further comprises ethylene glycol.*

*111. A composition comprising, or produced by combining, a titanium complex and hypophosphorous acid or its salt wherein said titanium complex is a complex of a titanium compound and a complexing agent wherein said titanium compound has the formula $Ti(OR)_4$, each R is independently selected from the group consisting of an alkyl radical, a cycloalkyl radical, aralkyl radical, and combinations of two or more thereof and contains from 1 to about 30 carbon atoms per radical; and said complexing agent is selected from the group consisting of an α-hydroxycarboxylic acid, alkanolamines, α-aminocarboxylic acids, and combinations of two or more thereof.*

*112. A composition according to claim 111 wherein said titanium compound is selected from the group consisting of tetra isopropyl titanate, tetra n-butyl titanate, and combinations thereof; and said complexing agent is selected from the group consisting of lactic acid, glycolic acid, citric acid, tartaric acid, malic acid, diethanolamine, triethanolamine, bis-hydroxyethyl glycine, tetrahydroxyisopropylethylenediamine, glycine, hydroxyethyl glycine, and combinations of two or more thereof.*

*113. A composition according to claim 111 or 112 wherein said composition further comprises a solvent selected from the group consisting of water, ethanol, propanol, isopropanol, butanol, ethylene glycol, propylene glycol, isopropylene glycol, butylene glycol, 1-methyl propylene glycol, pentylene glycol, and combinations of two or more thereof.*

*114. A composition according to claim 113 said solvent is selected from the group consisting of water, ethylene glycol, and combinations thereof.*

*115. A composition according to claim 114 wherein said titanium complex is TYZOR® LA (bis-ammonium lactate titanate).*

*116. A process comprising contacting, in the presence of a catalyst composition, a carbonyl compound and an alcohol wherein said catalyst comprises, or is produced by combining, a titanium compound, a complexing agent, and hypophosphorous acid or its salt wherein said complexing agent is selected from the group consisting of hydroxycarboxylic acids, alkanolamines, aminocarboxylic acids, and combinations of two or more thereof.*

*117. A process according to claim 116 wherein said titanium compound has the formula $Ti(OR)_4$ and each R is independently selected from the group consisting of an alkyl radical, a cycloalkyl radical, an aralkyl radical, and combinations of two or more thereof and contains from 1 to about 30 carbon atoms per radical.*

*118. A process according to claim 116 wherein said titanium compound is selected from the group consisting of tetra isopropyl titanate, tetra n-butyl titanate, and combinations thereof.*

*119. A process according to claim 116, 117, or 118 wherein said catalyst further comprises a solvent selected from the group consisting of water, ethanol, propanol, isopropanol, butanol, ethylene glycol, propylene glycol, isopropylene glycol, butylene glycol, 1-methyl propylene glycol, pentylene glycol, and combinations of two or more thereof.*

*120. A process according to claim 119 wherein said solvent is selected from the group consisting of water, ethylene glycol, and combinations thereof.*

*121. A process according to claim 116 wherein*

*said titanium compound has the formula $Ti(OR)_4$ wherein each R is independently selected from the group consisting of an alkyl radical, a cycloalkyl radical, an aralkyl radical, and combinations of two or more thereof and contains from 1 to about 30 carbon atoms per radical;*

*said complexing agent is selected from the group consisting of α-hydroxycarboxylic acids, alkanolamines, α-aminocarboxylic acids, and combinations of two or more thereof; and*

*said catalyst further comprises a solvent selected from the group consisting of ethanol, propanol, isopropanol, butanol, ethylene glycol, propylene glycol, isopropylene glycol, butylene glycol, 1-methyl propylene glycol, pentylene glycol, and combinations of two or more thereof.*

*122. A process according to claim 121 wherein said titanium compound is selected from the group consisting of tetra isopropyl titanate, tetra n-butyl titanate, and combinations thereof; said hypophosphorous acid or a salt thereof is sodium hypophosphite; said complexing agent is selected from the group consisting of lactic acid, glycolic acid, citric acid, tartaric acid, malic acid, diethanolamine, triethanolamine, tetrahydroxyisopropylethylenediamine, glycine, bis-hydroxyethyl glycine, hydroxyethyl glycine, and combinations of two or more thereof; and said solvent is selected from the group consisting of water, ethylene glycol, and combinations thereof.*

*123. A process according to claim 116 wherein said catalyst composition is a titanium complex produced by combining said titanium compound and said complexing agent; said titanium compound is selected from the group consisting of tetra isopropyl titanate, tetra n-butyl titanate, and combinations thereof; and said complexing agent selected from the group consisting of lactic acid, glycolic acid, citric acid, tartaric acid, malic acid, diethanolamine, triethanolamine, tetrahydroxyisopropylethylenediamine, glycine, bis-hydroxyethyl glycine, hydroxyethyl glycine, and combinations of two or more thereof.*

*124. A process according to claim 123 wherein said catalyst composition further comprises combining said titanium complex and sodium hypophosphite with a solvent selected from the group consisting of water, ethylene glycol, and combinations thereof.*

*125. A process according to any of claims 116 to 118 and 121 to 123 wherein said carbonyl compound has the formula of $R^2COOR^2$; each $R^2$ is independently selected from the group consisting of (1) hydrogen, (2) hydrocarboxyl radical having a carboxylic acid group at the terminus, or (3) hydrocarbyl radical in which each radical has 1 to about 30, preferably about 3 to about 15 carbon atoms per radical which can be alkyl, alkenyl, aryl, alkaryl, aralkyradical, (4) a 5-sulfo isophthalate metal salt or its ester, and (5) combinations of two or more thereof.*

*126. A process according to claim 120 wherein said carbonyl compound has the formula of $R^2COOR^2$; each $R^2$ is independently selected from the group consisting of (1) hydrogen, (2) hydrocarboxyl radical having a carboxylic acid group at the terminus, or (3) hydrocarbyl radical in which each radical has 1 to about 30, preferably about 3 to about 15 carbon atoms per radical which can be alkyl, alkenyl, aryl, alkaryl, aralkyradical, (4) a 5-sulfo isophthalate metal salt or its ester, and (5) combinations of two or more thereof.*

*127. A process according to claim 125 wherein said alcohol is selected from the group consisting of ethylene glycol, propylene glycol, isopropylene glycol, butylene glycol, 1-methyl propylene glycol, pentylene glycol, and combinations of two or more thereof.*

*128. A process according to claim 126 wherein said alcohol is selected from the group consisting of ethylene glycol, propylene glycol, isopropylene glycol, butylene glycol, 1-methyl propylene glycol, pentylene glycol, and combinations of two or more thereof.*

*129. A process according to claim 127 wherein said alcohol is ethylene glycol.*

*130. A process according to claim 128 wherein said alcohol is ethylene glycol.*

*131. A process according to claim 127 wherein said carbonyl compound is selected from the group consisting of terephthalic acid, dimethyl terephthalate, isophthalic acid, naphthalic acid, succinic acid, adipic acid, phthalic acid, glutaric acid, acrylic acid, oxalic acid, benzoic acid, maleic acid, propenoic acid, bis-glycolate ester of 5-sulfo isophthalate sodium salt, and combination of two or more thereof.*

*132. A process according to claim 128 wherein said carbonyl compound is selected from the group consisting of terephthalic acid, dimethyl terephthalate, isophthalic acid, naphthalic acid, succinic acid, adipic acid, phthalic acid, glutaric acid, acrylic acid, oxalic acid, benzoic acid, maleic acid, propenoic acid, bis-glycolate ester of 5-sulfo isophthalate sodium salt, and combination of two or more thereof.*

*133. A process according to claim 129 wherein said carbonyl compound is terephthalic acid.*

*134. A process according to claim 130 wherein said carbonyl compound is terephthalic acid.*

*135. A process according to claim 129 wherein said carbonyl compound comprises a mixture of terephthalic acid and bis-glycolate ester of 5-sulfo isophthalate sodium salt.*

*136. A process according to claim 130 wherein said carbonyl compound comprises a mixture of terephthalic acid and bis-glycolate ester of 5-sulfo isophthalate sodium salt.*

* * * * *